United States Patent
Tang et al.

(10) Patent No.: US 9,967,456 B2
(45) Date of Patent: May 8, 2018

(54) PHOTOGRAPHING METHOD AND DEVICE

(71) Applicant: Xiaomi Inc., Beijing (CN)

(72) Inventors: Mingyong Tang, Beijing (CN); Huayijun Liu, Beijing (CN); Yanlin Xiao, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days. days.

(21) Appl. No.: 14/721,040

(22) Filed: May 26, 2015

(65) Prior Publication Data

US 2016/0021281 A1    Jan. 21, 2016

Related U.S. Application Data

(63) Continuation of application No. PCT/CN2014/091424, filed on Nov. 18, 2014.

(30) Foreign Application Priority Data

Jul. 18, 2014 (CN) .......................... 2014 1 0345814

(51) Int. Cl.
*H04N 5/235* (2006.01)
*H04N 5/232* (2006.01)
*H04N 1/00* (2006.01)

(52) U.S. Cl.
CPC ........... *H04N 5/23222* (2013.01); *H04N 1/00* (2013.01)

(58) Field of Classification Search
CPC ................. G02B 21/367; H04N 5/147; H04N 2201/3247
See application file for complete search history.

(56) References Cited

U.S. PATENT DOCUMENTS 7,465,908 B2 * 12/2008 Kishida ............... G02B 21/365
                                                    250/201.3
8,208,732 B2    6/2012 Nakamura
(Continued)

FOREIGN PATENT DOCUMENTS

CN      101419666 A     4/2009
CN      101540863 A     9/2009
(Continued)

OTHER PUBLICATIONS

English version of International Search Report for PCT International Application No. PCT/CN2014/091424, from the State Intellectual Property Office of the P.R. China, dated Apr. 29, 2015.
(Continued)

*Primary Examiner* — Daniel M Pasiewicz
*Assistant Examiner* — Selam Gebriel
(74) *Attorney, Agent, or Firm* — Finnegan, Henderson, Farabow, Garrett & Dunner LLP

(57) ABSTRACT

A photographing method for use in a device includes: monitoring a current time and determining whether the current time reaches a preset shooting time; taking a first picture of an object when it is determined that the current time reaches the preset shooting time; determining a difference between a first image in a preset area of the first picture and a second image in the preset area of a second picture taken at a previous preset shooting time, the preset area corresponding to the object; and saving the first picture if the determined difference is equal to or greater than a preset threshold value.

16 Claims, 8 Drawing Sheets

(56) References Cited

U.S. PATENT DOCUMENTS

2009/0079850 A1* 3/2009 Okamoto ............ G02B 21/367
348/231.99
2009/0087099 A1 4/2009 Nakamura
2010/0039554 A1 2/2010 Mizuno et al.
2015/0002696 A1* 1/2015 He ..................... H04N 5/23222
348/231.6

FOREIGN PATENT DOCUMENTS

| | | | |
|---|---|---|---|
| CN | 101931743 A | 12/2010 |
| CN | 101978696 A | 2/2013 |
| CN | 102932635 A | 2/2013 |
| CN | 104113691 A | 10/2014 |
| EP | 1 148 715 A1 | 5/2007 |
| JP | 06-153143 A | 5/1994 |
| JP | 2002135724 A | 5/2002 |
| JP | 2002-218309 A | 8/2002 |
| JP | 2003-288363 A | 10/2003 |
| JP | 2004-187018 A | 7/2004 |
| JP | 2004-309719 A | 11/2004 |
| JP | 2006-005600 A | 1/2006 |
| JP | 2007150993 A | 6/2007 |
| JP | 2008-103964 A | 5/2008 |
| JP | 2009-135726 A | 6/2009 |
| JP | 2009135762 A | 6/2009 |
| JP | 2010-087899 A | 4/2010 |
| JP | 2011-107720 A | 6/2011 |
| WO | WO 2007132870 A1 | 11/2007 |

OTHER PUBLICATIONS

Office Action mailed by the Russian Patent Office on May 19, 2016, in counterpart Russian Application No. 2015104998 and English translations thereof.

International Search Report of PCT/CN2014/091424, from the State Intellectual Property Office of China, mailed Apr. 29, 2015.

European Search Report for Application No. 15162613.2, from the European Patent Office, dated Jun. 12, 2015.

Office Action issued in Mexican Patent Application No. MX/a/2015/001997, mail from Mexican Institute of Industrial Property, dated Jul. 28, 2017.

* cited by examiner

PHOTOGRAPHING METHOD AND DEVICE

CROSS-REFERENCE TO RELATED APPLICATIONS

This application is a Continuation application of International Application No. PCT/CN2014/091424, filed Nov. 18, 2014, which is based on and claims priority to Chinese Patent Application No. 201410345814.9, filed Jul. 18, 2014, the entire contents of all of which are incorporated herein by reference.

TECHNICAL FIELD

The present disclosure generally relates to the field of photographic technology and, more particularly, to a photographing method and a photographing device.

BACKGROUND

Conventionally, desired pictures may be difficult to take due to constraints of equipment or operation modes. For example, to take pictures of a blooming and fading process of a flower, multiple pictures may need to be taken at certain times, and a status of the flower during anthesis, florescence, and fading may also vary. As a result, desired pictures may be missed due to a long shooting interval, and undesired pictures with inconspicuous or no change may be taken due to a short shooting interval.

SUMMARY

According to a first aspect of the present disclosure, there is provided a photographing method for use in a device, comprising: monitoring a current time and determining whether the current time reaches a preset shooting time; taking a first picture of an object when it is determined that the current time reaches the preset shooting time; determining a difference between a first image in a preset area of the first picture and a second image in the preset area of a second picture taken at a previous preset shooting time, the preset area corresponding to the object; and saving the first picture if the determined difference is equal to or greater than a preset threshold value.

According to a second aspect of the present disclosure, there is provided a device, comprising: a processor; and a memory for storing instructions executable by the processor; wherein the processor is configured to: monitor a current time and determine whether the current time reaches a preset shooting time; take a first picture of an object when it is determined that the current time reaches the preset shooting time; determine a difference between a first image in a preset area of the first picture and a second image in the preset area of a second picture taken at a previous preset shooting time, the preset area corresponding to the object; and save the first picture if the determined difference is equal to or greater than a preset threshold value.

According to a third aspect of the present disclosure, there is provided a non-transitory computer-readable storage medium having stored therein instructions that, when executed by a processor of a device, cause the device to perform a photographing method, the method comprising: monitoring a current time and determining if the current time reaches a preset shooting time; taking a first picture of an object when it is determined that the current moment reaches the preset shooting time; determining a difference between a first image in a preset area of the first picture and a second image in the preset area of a second picture taken at a previous preset shooting time, the preset area corresponding to the object; and saving the first picture when the determined difference is equal to or greater than a preset threshold value.

It shall be appreciated that the above general description and the detailed description hereinafter are only illustrative but not for limiting the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1A:
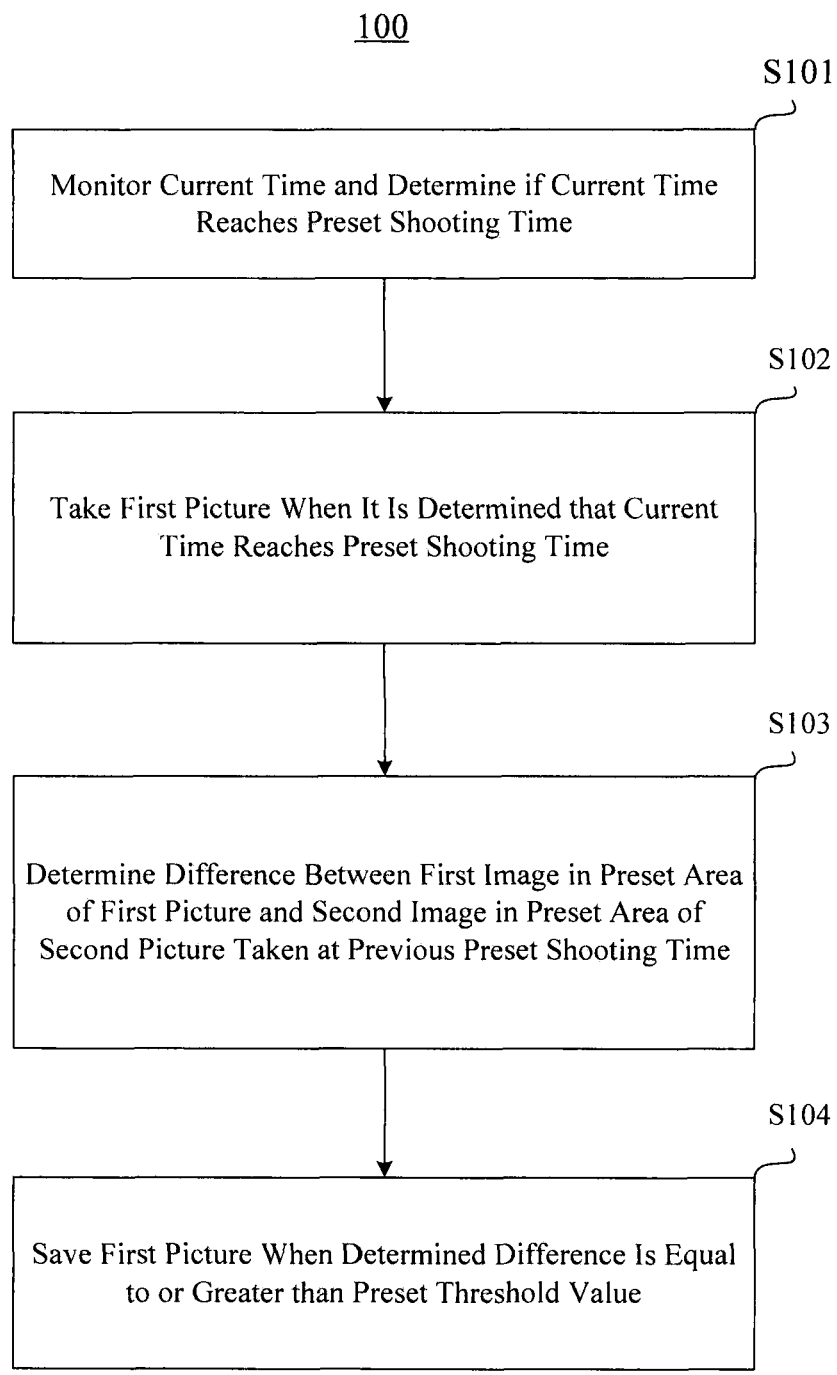
FIG. 1A is a flow chart of a photographing method, according to an exemplary embodiment.

FIG. 1A is a flow chart showing a photographing method 100, according to an exemplary embodiment. For example, the photographing method 100 may be used in a terminal having a photographing function, such as a camera, a mobile phone, a tablet computer and the like. Referring to FIG. 1A, the photographing method 100 includes the following steps.

In step S101, the terminal monitors a current time and determines if the current time reaches a preset shooting time. For example, the shooting time may be preset by a user or by the terminal.

In step S102, the terminal takes a first picture when it is determined that the current time reaches the preset shooting time.

In step S103, the terminal determines a difference between a first image in a preset area in the first picture and a second image in the preset area in a second picture, the second picture being taken at a previous preset shooting time.

For example, the preset area corresponds to a same object of interest, e.g., a flower in a blooming process. The area may be preset by a user, or automatically preset by the terminal after the terminal determines which area in a picture includes the object of interest based on a pre-shooting analysis.

In one exemplary embodiment, when the first image and the second image in the preset area are each a plant image, the terminal determines the difference between the first image and the second image to include at least one of: a difference value between a first ratio of an area of the plant image relative to an area of the first picture, and a second ratio of an area of the plant image relative to an area of the second picture; or a difference value between the area of the plant image in the first picture and the area of the plant image in the second picture. In this manner, a variation of the plant image is determined by comparing the first and second ratios of the plant image relative to the first picture and the second picture, or the shapes of the plant image in the first picture and the second picture.

In step S104, the terminal saves the first picture when the determined difference is equal to or greater than a preset threshold value, e.g., 10%.

Figure 1B:
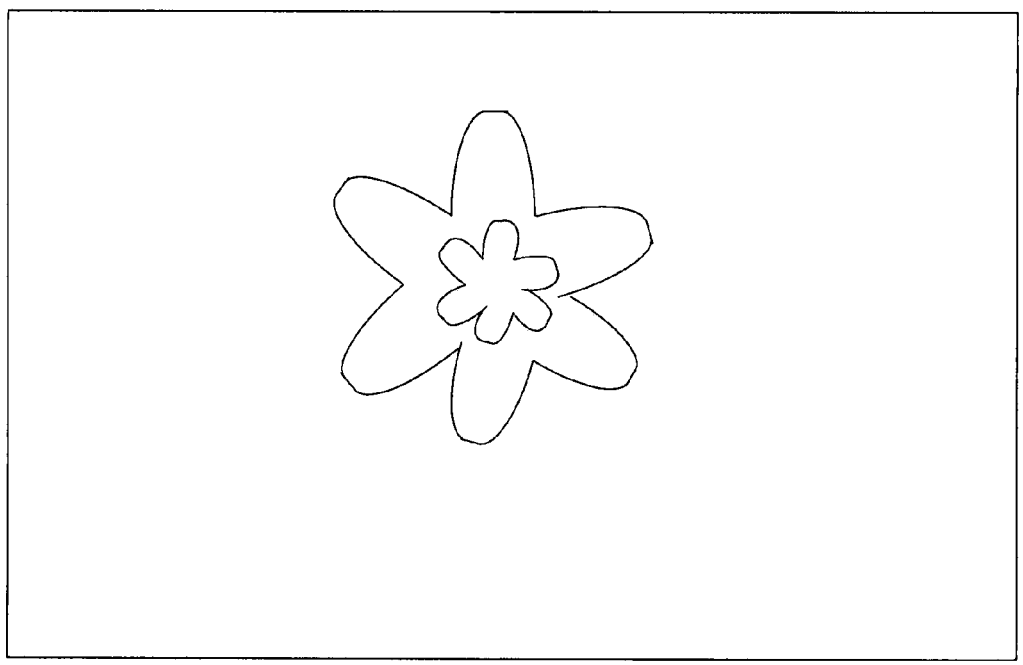
FIG. 1B is a schematic diagram of a picture, according to an exemplary embodiment.
Figure 1C:
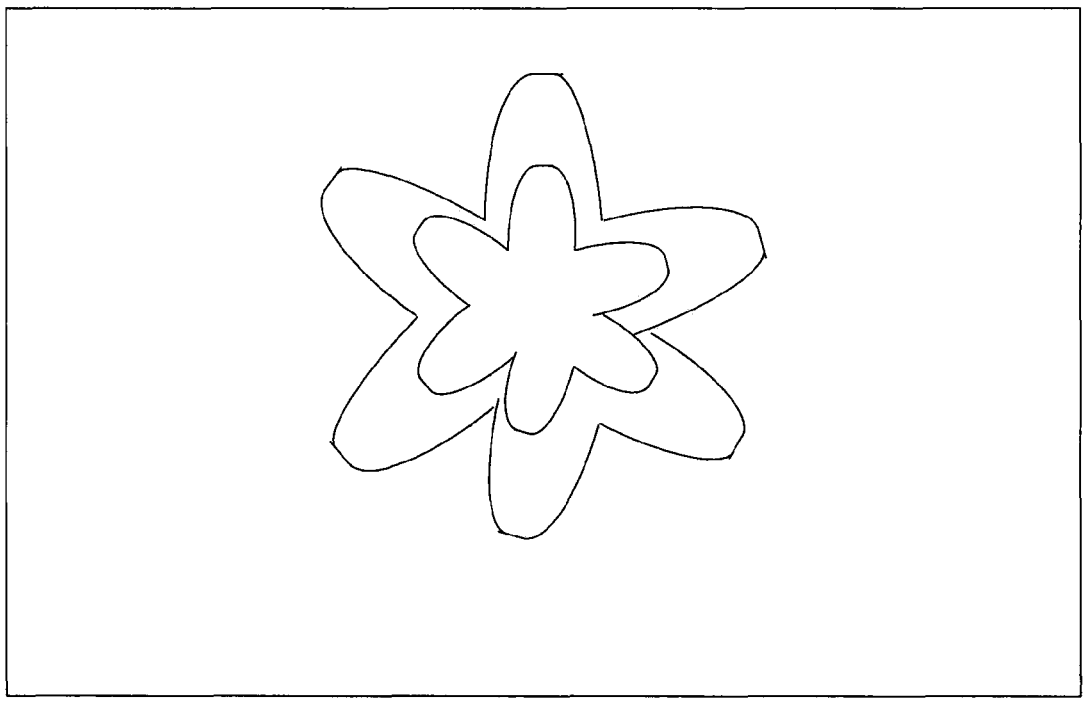
FIG. 1C is a schematic diagram of a picture, according to an exemplary embodiment.

In one exemplary embodiment, the object photographed is a flower and, compared with the flower in the second picture taken at the previous preset shooting time, the flower in the first picture taken at the current shooting time increases in area by a preset threshold value 10% or more. Under this circumstance, it is regarded that a status of the flower has changed, and the first picture taken at the current shooting time is saved. FIG. 1B is a schematic diagram of the second picture, FIG. 1C is a schematic diagram of the first picture, according to an exemplary embodiment. The first picture and the second picture both include a flower image. By comparing the flower image in both the first and second pictures, the terminal determines that the flower in the first picture increases by 12% in area compared to the flower in the second picture, which is greater than the preset threshold value 10%. Accordingly, the first picture is saved.

The photographing method 100 can be used to photograph potted plants, cityscape, natural scenery, astronomical phenomena, transportation and living conditions, biological evolution, and scientific research, etc.

By using the photographing method 100, the terminal automatically takes pictures, and saves suitable pictures for users for generating moving images or synthesizing a video at a later time, thus meeting user demands and saving user time.

In exemplary embodiments, when the difference determined at step S103 is smaller than the preset threshold value, the terminal does not save the first picture. For example, when the difference between the first image in the first picture taken at the current shooting time and the second image in the second picture taken at the previous preset shooting time is smaller than the preset threshold value, it indicates that the object photographed has an inconspicuous change or no change. Under this circumstance, the first picture does not need to be saved, thus not only saving memory space of the terminal, but also avoiding manually removing the first picture by the user in a post production of moving images or a synthetic video.

In exemplary embodiments, prior to step S101, the method 100 also includes setting the preset shooting time, which may be implemented as follows.

In a first implementation, setting the preset shooting time is implemented by receiving the shooting time inputted by the user, and determining the inputted shooting time as the preset shooting time. For example, if the user is familiar with changing characteristics of the object to be photographed, the user may manually input one or more shooting times, and the terminal automatically takes pictures of the object at each of the one or more inputted shooting times. The first implementation is suitable for photographing objects whose status changes uniformly, for example, a solar eclipse or a lunar eclipse.

In a second implementation, setting the preset shooting time may be implemented by identifying the object to be photographed and acquiring an identification result, the identification result including category information and/or a changing parameter relating to the object to be photographed, and determining the preset shooting time according to the identification result. For example, a database may be established in advance, to store category information and changing parameters relating to different objects. The terminal may first take a picture of the object and identify the object by using an image recognition technology, such that at least one of the category information or the changing parameter relating to the object is determined according to data in the database. For example, when the object is a flower, a flower species or a name of the flower may be identified by using the database, thus determining a blooming cycle of the flower. It is efficient to set one or more preset shooting times according to the blooming cycle of the flower.

In a third implementation, setting the preset shooting time is implemented by receiving a shooting time interval inputted by the user, and determining the preset shooting time according to the inputted shooting time interval. For example, the user may manually input one or more shooting time intervals, and take an initial picture of the object. The terminal automatically takes a picture of the object after each of the one or more shooting time intervals.

In one exemplary embodiment, each shooting time interval inputted may be equivalent or varied according to changing characteristics of the object to be photographed and a shooting progress. For example, each shooting time interval may be set equivalent when taking pictures of cloud changes. Also for example, when taking pictures of an egg hatching process, a longer shooting time interval may be set before an egg hatches, and a shorter shooting time interval may be set during the egg hatching. As another example, when taking pictures of a cell division process, different shooting time intervals may be set according to features of cell division.

In a fourth implementation, setting the preset shooting time may be implemented by acquiring at least two pictures sequentially taken prior to the current shooting time according to a first shooting time interval, and determining whether images in the preset area of the at least two pictures are substantially the same. If those images are substantially the same, a second shooting time interval greater than the first shooting time interval is set, and the preset shooting time is determined according to the second shooting time interval. If those images are not substantially the same, and a difference between two of those images in two adjacent pictures, corresponding to two adjacent preset shooting times, is equal to or greater than a preset threshold value, a third shooting time interval smaller than the first shooting time interval is set, and the preset shooting time is determined according to the third shooting time interval.

For example, when the images in the preset area of the at least two pictures sequentially taken are substantially the same, it indicates that the object does not have an obvious change and the current shooting time interval is too short. Thus, a greater shooting time interval is set. Similarly, if the difference between two images in the preset area of two adjacent pictures is equal to or greater than the preset threshold value, it indicates that the object may have an obvious change and the current shooting time interval is too long. Thus, a smaller shooting time interval is set. For example, when the object to be photographed is a flower, and if an area of the flower in two adjacent pictures taken at the first shooting time interval increases or decreases in excess of the preset threshold value, e.g., 20%, it indicates that a change of the flower is obvious and the first time interval is set too long. Thus, the shooting time interval is appropriately shortened, and is set to the third shooting time interval smaller than the first shooting time interval.

In one exemplary embodiment, after step S104, the method 100 also includes stopping photographing the object. For example, the terminal acquires the first picture and a next picture sequentially taken after the first picture, and determines a difference between the first image in the preset area of the first picture and a third image in the preset area of the next picture. The terminal stops photographing the object if there is no difference between the first image and the third image.

In one exemplary embodiment, the method 100 also includes stopping photographing the object according to a stop instruction inputted by the user. For example, when the object photographed is a flower, pictures continuously taken after flower withers are substantially the same, e.g., there is no area variation of the object in the images in the preset area. Under this circumstance, for the convenience of the user, the terminal may stop photographing the object automatically, or according to the stop instruction inputted by the user.

In one exemplary embodiment, the method 100 also includes integrating, in accordance with the shooting sequence, saved pictures to generate moving images. For example, it may need about 72 hours for a flower to bloom. When photographing is conducted according to preset shooting times set in any one of foregoing four implementations, a blooming process is recorded in a sequence that includes, for example, 144 saved pictures. All of the 144 pictures can be displayed by a projector at a frequency of 24 pictures per second, thus forming moving images.

Moreover, saved pictures can be synthesized to a video by software with a function of synthesizing videos, such as Photoshop and the like, thus recording the changing process of the object photographed.

In one exemplary embodiment, prior to step S102, the method 100 also includes acquiring an environmental parameter; and adjusting a photographing parameter according to the environmental parameter. Accordingly, step S102 includes taking the first picture according to the adjusted photographing parameter when the current time reaches the preset shooting time.

For example, environmental parameters include an indoor scene, an outdoor scene, an illumination intensity, weather parameters, etc. Also for example, photographing parameters include an aperture value, a shutter speed, a light sensitivity, an exposure compensation value, a white balance, etc.

In one exemplary embodiment, photographing parameters may be adjusted according to variation of environmental parameters. For example, when the environmental parameters indicate that it is night, as photographing parameters for daytime are generally not suitable for night, the photographing parameters are set according to the environmental parameters to, e.g., aperture value F2.8, shutter speed 2s, light sensitivity 3200, exposure compensation value +2, and white balance Auto. Once reaching preset shooting times, pictures are taken and saved according to the adjusted photographing parameters to acquire clearer pictures.

The method 100 may automatically select to save or discard pictures according to a status change of the object photographed, thus avoiding the user's manually removing undesired pictures in the post production.

Figure 2:
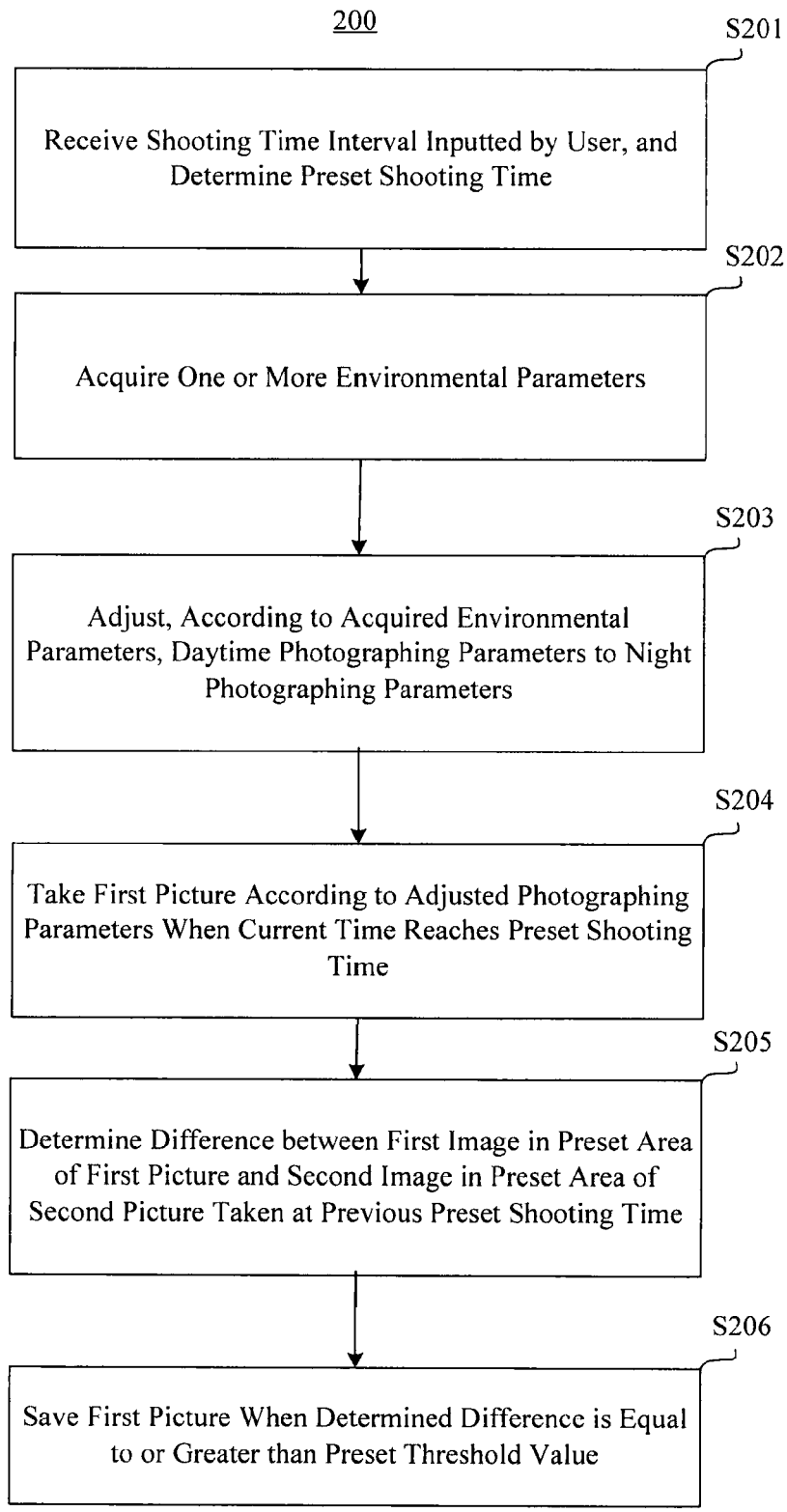
FIG. 2 is a flow chart of a photographing method, according to an exemplary embodiment.

FIG. 2 is a flow chart of a photographing method 200, according to an exemplary embodiment. For example, the method 200 is used in a terminal, such as a digital camera. In the illustrated embodiment, the shooting time interval is set to 5 minutes, the preset threshold value for saving pictures (step S104 in FIG. 1) is set to 8%. For environmental parameters, the indoor illumination intensity is assumed to be 100-700 lx at daytime, and 0.1 lx at night. It is also assumed that photographing parameters at daytime are: aperture value F8, shutter speed 1/400s, light sensitivity 800, exposure compensation value +1, and white balance sunlight. It is further assumed that photographing parameters at night are: aperture value F4.5, shutter speed 2s, light sensitivity 3200, exposure compensation value +2, and white balance incandescent lamp. Referring to FIG. 2, the method 200 includes the following steps.

In step S201, the digital camera receives the shooting time interval inputted by a user, and determines a preset shooting time according to the shooting time interval and the time when the digital camera receives the inputted shooting time interval.

In step S202, the digital camera acquires one or more environmental parameters, and executes step S203 when the acquired environmental parameters indicate that daytime is changed to night.

In step S203, the digital camera adjusts, according to the acquired environmental parameters, daytime photographing parameters to night photographing parameters.

In step S204, the digital camera takes a first picture according to the adjusted photographing parameters when a current time reaches the preset shooting time.

In step S205, the digital camera determines a difference between a first image in a preset area in a first picture and a second image in the preset area in a second picture taken at a previous preset shooting time.

In step S206, the digital camera saves the first picture when the determined difference is equal to or greater than the preset threshold value.

In the illustrated embodiment, photographing parameters are automatically adjusted based on environmental parameters, thus ensuring taking satisfactory pictures and avoiding manually inputting parameters by the user.

Figure 3:
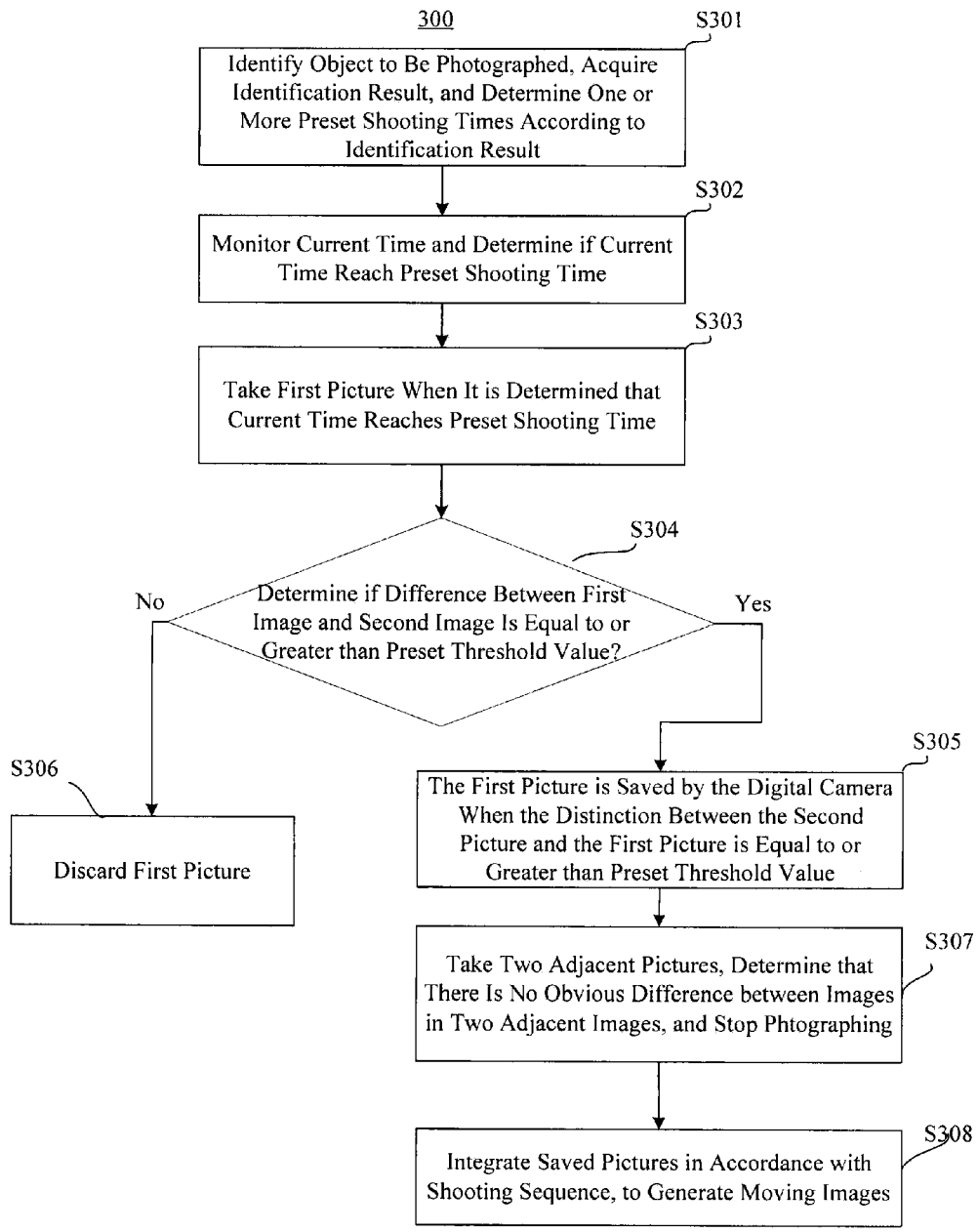
FIG. 3 is a flow chart of a photographing method, according to an exemplary embodiment.

FIG. 3 is a flow chart of a photographing method 300, according to an exemplary embodiment. For example, the method 300 is used in a terminal, such as a digital camera. In the illustrated embodiment, the preset threshold value for saving pictures (step S104 in FIG. 1) is set to 10%. It is assumed that a user wants to take pictures of a blooming and fading process of an epiphyllum, which usually blooms at seven or eight o'clock at night and fades at eleven or twelve o'clock, lasting three to four hours. Referring to FIG. 3, the method 300 includes the following steps.

In step S301, based on a database established in advance, the digital camera identifies an object to be photographed, acquires an identification result, and determines one or more preset shooting times according to the identification result. In the illustrated embodiment, the digital camera identifies the object to be an epiphyllum, and determines a time period for each of anthesis, florescence and fading, and a status change rate in the time period. For example, it is determined that anthesis lasts 10 minutes, and the status change of the flower is relatively fast. Accordingly, preset shooting times during the anthesis are set to shooting once every two seconds. Also for example, it is determined that florescence lasts 2.5 hours and the status change of the flower is not obvious. Accordingly, preset shooting times during the florescence are set to shooting once every 10 minutes. Further for example, it is determined that fading lasts 0.5 hour. Accordingly, preset shooting times during the fading are set to shooting once every 2 minutes.

In step S302, the digital camera monitors a current time and determines whether the current time reaches a preset shooting time.

In step S303, the digital camera takes a first picture of the epiphyllum when it is determined that the current time reaches the preset shooting time.

In step S304, the digital camera determines if a difference between a first image in a preset area in the first picture and a second image in the preset area in a second picture taken at a previous preset shooting time is equal to or greater than a preset threshold value. In the illustrated embodiment, the difference between the first image and the second image may be a difference value between a first ratio of an area of the epiphyllum image relative to an area of the first picture, and a second ratio of an area of the epiphyllum image relative to an area of the second picture, or may be a difference value between the area of the epiphyllum image in the first picture and the area of the epiphyllum image in the second picture.

In step S305, the digital camera saves the first picture when it is determined that the difference between the first image and the second image is equal to or greater than the preset threshold value.

In step S306, the digital camera discards the first picture by not saving the first picture, when it is determined that the difference between the first image and the second image is smaller than the preset threshold value.

In step S307, the digital camera takes two adjacent pictures, after taking the first picture, and determines that there is no obvious difference between the epiphyllum images in the two adjacent pictures. Accordingly, the digital camera stops photographing the epiphyllum. Step 307 may also be implemented as stopping photographing according to a stop instruction inputted by the user.

In step S308, the digital camera integrates saved pictures in accordance with the shooting sequence, to generate moving images.

Figure 4:
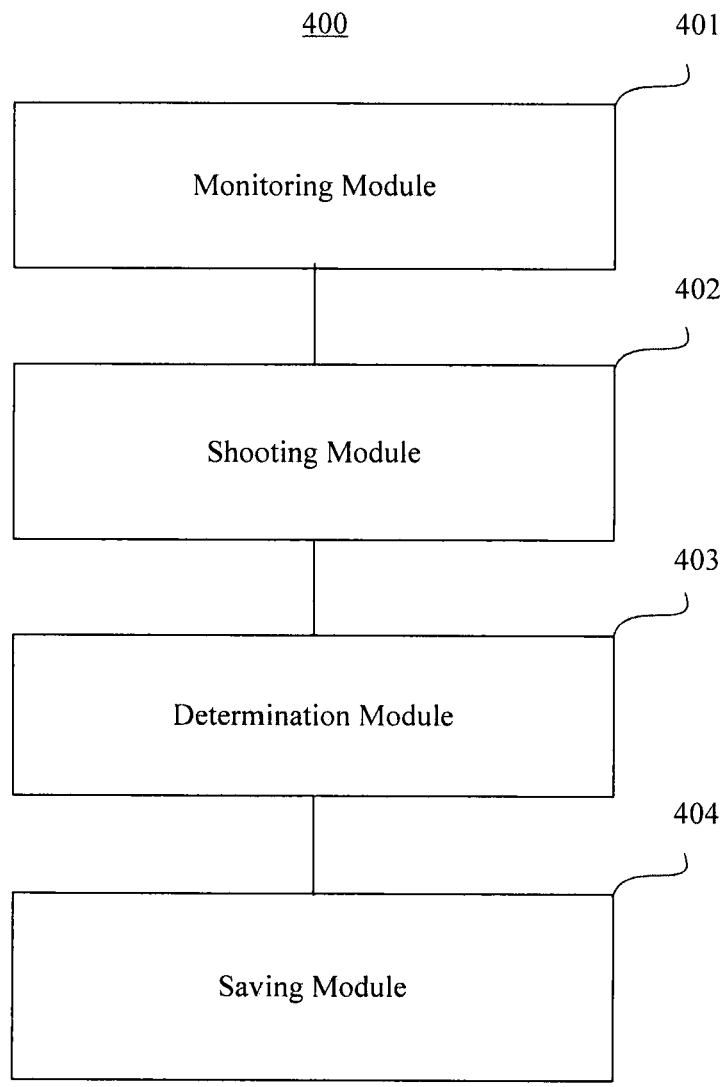
FIG. 4 is a block diagram of a photographing device, according to an exemplary embodiment.

FIG. 4 is a block diagram of a photographing device 400, according to an exemplary embodiment. Referring to FIG. 4, the photographing device 400 includes a monitoring module 401, a shooting module 402, a determination module 403, and a saving module 404.

The monitoring module 401 is configured to monitor a current time and determines whether the current time reaches a preset shooting time. The shooting module 402 is configured to take a first picture of an object when it is determined that the current time reaches the preset shooting time. The determination module 403 is configured to determine a difference between a first image in a preset area in the first picture and a second image in the preset area in a second picture taken at a previous preset shooting time, the preset area corresponding to the object. The saving module 404 is configured to save the first picture when the difference is equal to or greater than a preset threshold value.

Figure 5:
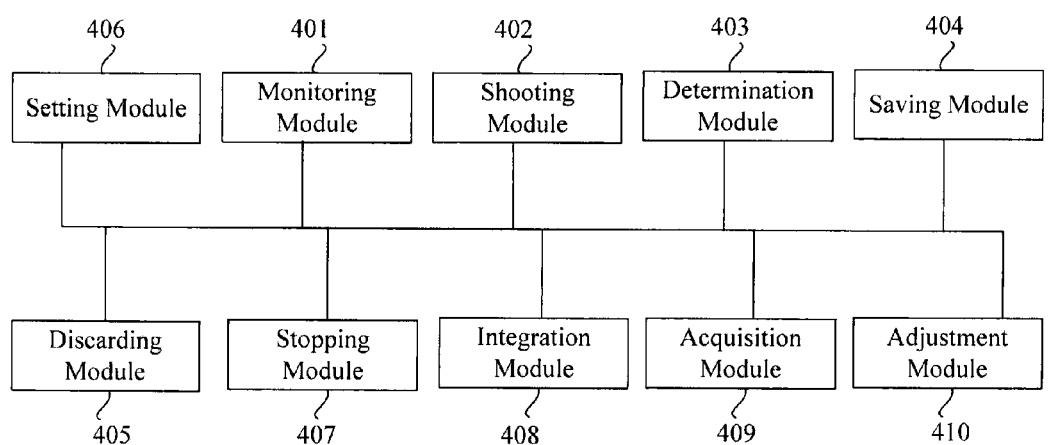
FIG. 5 is a block diagram of a photographing device, according to an exemplary embodiment.

FIG. 5 is a block diagram of a photographing device 500, according to an exemplary embodiment. Referring to FIG. 5, the photographing device 500 includes a discarding module 405 and a setting module 406, in addition to the monitoring module 401, the shooting module 402, the determination module 403, and the saving module 404 (FIG. 4).

The discarding module 405 is configured to discard the first picture when the difference between the first image and the second image is smaller than the preset threshold value. The setting module 406 is configured to set one or more preset shooting times using the above described methods.

In exemplary embodiments, the photographing device 500 further includes a stopping module 407 configured to, after the first picture is saved, stop photographing the object when it is determined that there is no difference between two images in the preset area of two adjacent pictures, or when the stopping module 407 receives a stop instruction inputted by a user.

In exemplary embodiments, the photographing device 500 further includes an integration module 408 configured to integrate, in accordance with the shooting sequence, saved pictures to generate moving images.

In exemplary embodiments, the photographing device 500 further includes an acquisition module 409 configured to acquire one or more environmental parameters before the first picture is taken, and an adjustment module 410 configured to adjust one or more photographing parameters according to the environmental parameters. Accordingly, the shooting module 402 is configured to take the first picture of the object according to the adjusted photographing parameters when it is determined that the current time reaches the preset shooting time.

Figure 6:
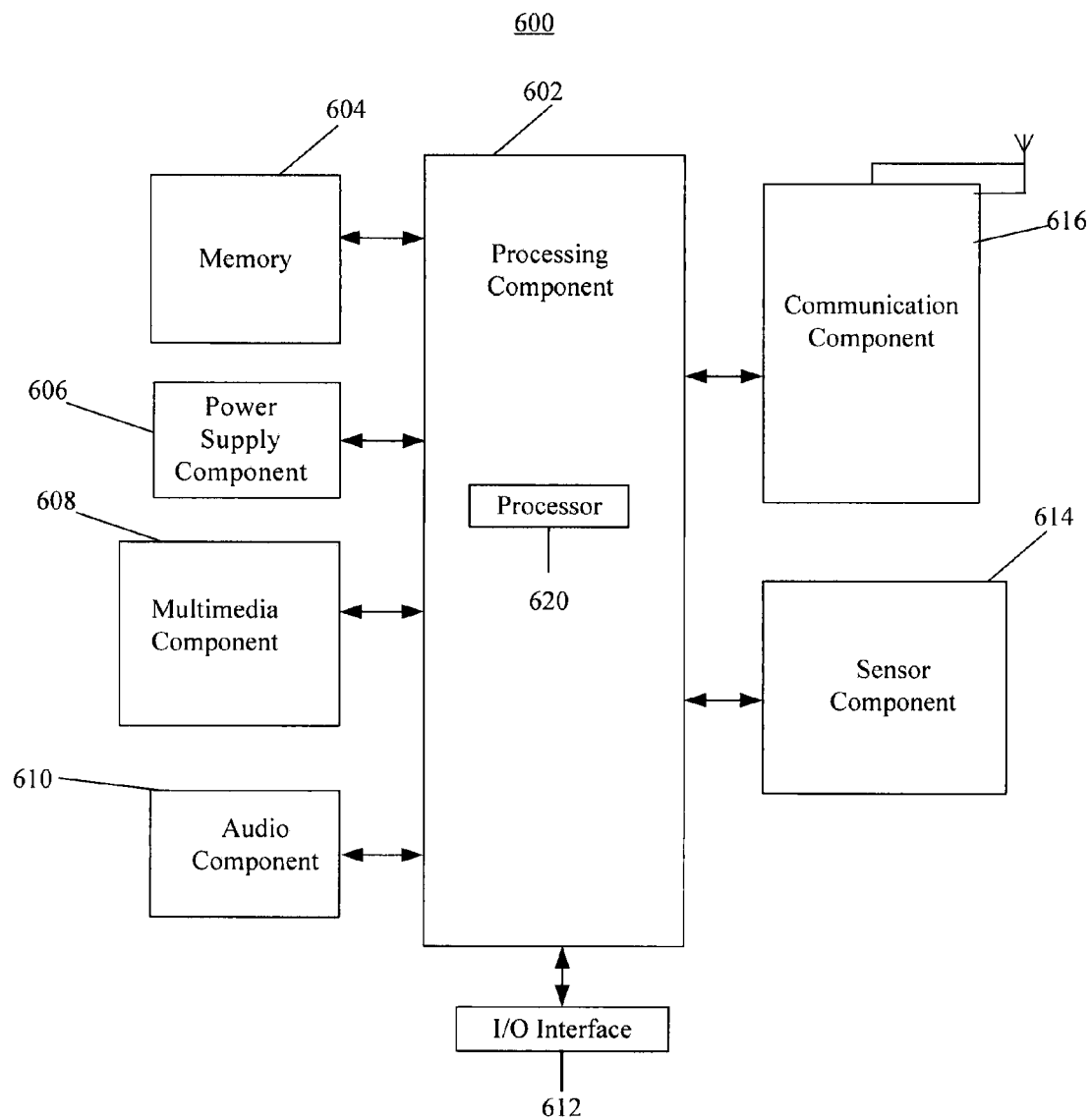
FIG. 6 is a block diagram fit for a photographing device, according to an exemplary embodiment.

FIG. 6 is a block diagram of a photographing device 600, according to an exemplary embodiment. For example, the device 600 may be a digital camera, a mobile telephone, a computer, a digital broadcasting terminal, a message transceiver device, a games console, a tablet device, a medical device, a fitness facility, a personal digital assistant (PDA) and the like.

Referring to FIG. 6, the device 600 may include one or more of the following components: a processor component 602, a memory 604, a power supply component 606, a multimedia component 608, an audio component 610, an input/output (I/O) interface 612, a sensor component 614, and a communication component 616.

The processor component 602 usually controls the overall operation of the device 600, for example, display, telephone call, data communication, and operation associated with camera operation and record operation. The processor component 602 may include one or a plurality of processors 620 for executing instructions so as to complete steps of the above methods in part or in whole. In addition, the processor component 602 may include one or a plurality of modules for the convenience of interaction between the processor component 602 and other components. For example, the processor component 602 may include a multimedia module for the convenience of interaction between the multimedia component 608 and the processor component 602.

The memory 604 is configured to store data of different types so as to support the operation of the device 600. Examples of the data include any application program or approach directive for operation of the device 600, including contact data, phonebook data, message, picture and video, etc. The memory 604 may be realized by volatile or non-volatile memory device of any type or combination thereof, for example, static random access memory (SRAM), electrically erasable programmable read-only memory (EEPROM), erasable programmable read only memory (EPROM), programmable read-only memory (PROM), read-only memory (ROM), magnetic memory, flash memory, magnetic disk or optical disk.

The power supply component 606 provides power for components of the device 600. The power supply component 606 may include a power management system, one or a plurality of power supplies, and other components associated with generation, management and power distribution of the device 600.

The multimedia component 608 includes a screen for providing an output interface. In some embodiments, the screen may include an Liquid Crystal Display (LCD) and a touch panel (TP). If the screen includes a touch panel, the screen may be realized as a touch screen for receiving input signal from users. The touch panel includes one or a plurality of touch sensors for sensing gestures on the touch panel, for example, touching and sliding, etc. The touch sensor not only can sensor trip boundary of touching or sliding, but also can detect the duration and pressure related to the touching or sliding operation. In some embodiments, the multimedia component 608 includes a front-facing camera and/or a rear-facing camera. When the device 600 is under an operation mode, for example, capture mode or video mode, the front-facing camera and/or the rear-facing camera may receive external multimedia data. Each front-facing camera and rear-facing camera may be a fixed optical lens system or have focal length and optical zoom capacity.

The audio component 610 is configured to output and/or input audio signals. For example, the audio component 610 includes a microphone. When the device 600 is under an operation mode such as call mode, record mode and speech recognition mode, the microphone is configured to receive external audio signals. The audio signals received may be further stored in the memory 604 or sent out by the communication component 616. In some embodiments, the audio component 610 also includes a loudspeaker for outputting audio signals.

The I/O interface 612 provides an interface for the processor component 602 and peripheral interface modules, and the peripheral interface modules may be a keyboard, a click wheel and buttons, etc. These buttons may include but not limited to: a home button, a volume button, a start button and a locking button.

The sensor component 614 includes one or a plurality of sensors for providing the device 600 with state evaluation from all aspects. For example, the sensor component 614 may detect the on/off state of the device 600, relative positioning of components, for example, the display and keypad of the device 600. The sensor component 614 may also detect the position change of the device 600 or a component thereof, the presence or absence of users' touch on the device 600, the direction or acceleration/deceleration of the device 600, and temperature variation of the device 600. The sensor component 614 may also include a proximity detector, which is configured to detect the presence of nearby objects in case of no physical touch. The sensor component 614 may also include an optical sensor, for example, CMOS or CCD image sensor for imaging. In some embodiments, the sensor component 614 may also include an acceleration sensor, a gyro sensor, a magnetic sensor, a pressure sensor, or a temperature sensor.

The communication component 616 is configured to facilitate wired communication or wireless communication between the device 600 and other equipment. The device 600 is configured to access a wireless network based on communication standards, for example, WiFi, 2G or 3G, or a combination thereof. In one exemplary embodiment, the communication component 616 receives a broadcast signal or broadcast-related information from external broadcast management systems. In one exemplary embodiment, the communication component 616 also includes a near field communication (NFC) module for short-range communications. For example, the NFC module may be realized on the basis of Radio Frequency Identification (RFID) technology, Infrared Data Association (IrDA) technology, Ultra-wide Bandwidth (UWB) technology, Bluetooth (BT) technology and other technologies.

In exemplary embodiments, the device 600 may be realized by one or more of an application specific integrated circuit (ASIC), a digital signal processor (DSP), digital signal processing equipment (DSPD), a programmable logic device (PLD), a field programmable gate array (FPGA), a controller, a microcontroller, a microprocessor, or other electronic components, configured to perform the above methods.

In exemplary embodiments, there is also provided a non-transitory computer-readable storage medium including instructions, such as included in the memory 604, executable by the processing component 602 of the device 600, for performing the above described methods. For example, the non-transitory computer-readable storage medium may be a read-only memory (ROM), a random access memory (RAM), a CD-ROM, a magnetic tape, a floppy disk, an optical data storage device, etc.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of submodules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A photographing method performed by a device with a photographing function, comprising:
  setting a preset shooting time for photographing an object, including:
    taking at least two pictures of the object sequentially according to a first shooting time interval;
    determining whether images in a preset area of the at least two pictures are substantially the same, the preset area corresponding to the object;
    setting a second shooting time interval greater than the first shooting time interval if it is determined that the images in the preset area are the same, and determining the preset shooting time according to the second shooting time interval; and
    setting a third shooting time interval shorter than the first shooting time interval if it is determined that a difference between the images in the preset area of two adjacent pictures of the at least two pictures is equal to or greater than a first preset threshold value, and determining the preset shooting time according to the third shooting time interval;

monitoring a current time and determining whether the current time reaches the preset shooting time;

taking a first picture of the object when it is determined that the current time reaches the preset shooting time;

determining a difference between a first image in the preset area of the first picture and a second image in the preset area of a second picture taken at a previous preset shooting time; and saving the first picture if the determined difference between the first and second images is equal to or greater than a second preset threshold value.

2. The method of claim 1, further comprising:
discarding the first picture if the determined difference between the first and second images is smaller than the preset second threshold value.

3. The method of claim 1, wherein the setting of the preset shooting time comprises:
receiving a shooting time inputted by a user; and
determining the inputted shooting time as the preset shooting time.

4. The method of claim 1, wherein the setting of the preset shooting time comprises:
identifying the object and acquiring an identification result, the identification result including at least one of category information or a changing parameter relating to the object; and
determining the preset shooting time according to the identification result.

5. The method of claim 1, wherein the setting of the preset shooting time comprises:
receiving a shooting time interval inputted by a user; and
determining the preset shooting time based on the inputted shooting time interval.

6. The method according to claim 1, wherein when the preset area corresponds to a plant, the determining of the difference comprises at least one of:
determining a difference value between a first ratio of an area of the first image relative to an area of the first picture, and a second ratio of an area of the second image relative to an area of the second picture; or
determining a difference value between the area of the first image in the first picture and the area of the second image in the second picture.

7. The method of claim 1, further comprising:
taking a next picture of the object at a next preset shooting time next to the current preset shooting time, the first picture and the next picture being adjacent pictures;
determining if there is a difference between a next image in the preset area of the next picture and the first image in the preset area of the first picture; and
stopping photographing the object when it is determined that there is no difference.

8. The method of claim 1, further comprising:
integrating, in accordance with a shooting sequence, a plurality of saved pictures to generate moving images.

9. The method according to claim 1, wherein before the taking of the first picture, the method further comprises:
acquiring an environmental parameter; and
adjusting a photographing parameter according to the environmental parameter; and
wherein the taking of the first picture comprises:

taking the first picture according to the adjusted photographing parameter when it is determined that the current time reaches the preset shooting time.

10. A device with a photographing function, comprising:
a processor; and
a memory for storing instructions executable by the processor;
wherein the processor is configured to:
set a preset shooting time for photographing an object;
monitor a current time and determine whether the current time reaches a preset shooting time;
take a first picture of the object when it is determined that the current time reaches the preset shooting time;
determine a difference between a first image in a preset area of the first picture and a second image in the preset area of a second picture taken at a previous preset shooting time, the preset area corresponding to the object; and
save the first picture if the determined difference is equal to or greater than a first preset threshold value,
wherein in setting the preset shooting time, the processor is further configured to:
take at least two pictures of the object sequentially according to a first shooting time interval;
determine whether the images in the preset area of the at least two pictures are substantially the same;
set a second shooting time interval greater than the first shooting time interval if it is determined that the images in the preset area are the same, and determine the preset shooting time according to the second shooting time interval; and
set a third shooting time interval smaller than the first shooting time interval if it is determined that a difference between the images in the preset area of two adjacent pictures of the at least two pictures is equal to or greater than a second preset threshold value, and determined the preset shooting time according to the third shooting time interval.

11. The device of claim 10, wherein the processor is further configured to:
discard the first picture if the determined difference between the first and second images is smaller than the first preset threshold value.

12. The device of claim 10, wherein the processor is further configured to:
receive a shooting time inputted by a user; and
determine the inputted shooting time as the preset shooting time.

13. The device of claim 10, wherein the processor is further configured to:
identify the object and acquire an identification result, the identification result including at least one of category information or a changing parameter relating to the object; and
determine the preset shooting time according to the identification result.

14. The device of claim 10, wherein the processor is further configured to:
receive a shooting time interval inputted by a user; and
determine the preset shooting time based on the inputted shooting time interval.

15. The device of claim 10, wherein when the preset area corresponds to a plant, the processor is further configured to perform at least one of:
determining a difference value between a first ratio of an area of the first image relative to an area of the first picture, and a second ratio of an area of the second image relative to an area of the second picture; or determining a difference value between the area of the first image in the first picture and the area of the second image in the second picture.

16. A non-transitory computer-readable storage medium having stored therein instructions that, when executed by a processor of a device with a photographing function, cause the device to perform a photographing method, the method comprising:

setting a preset shooting time for photographing an object, including:

taking at least two pictures of the object sequentially according to a first shooting time interval;

determining whether images in a preset area of the at least two pictures are substantially the same, the preset area corresponding to the object;

setting a second shooting time interval greater than the first shooting time interval if it is determined that the images in the preset area are the same, and determining the preset shooting time according to the second shooting time interval; and setting a third shooting time interval shorter than the first shooting time interval if it is determined that a difference between the images in the preset area of two adjacent pictures of the at least two pictures is equal to or greater than a first preset threshold value, and determining the preset shooting time according to the third shooting time interval;

monitoring a current time and determining if the current time reaches the preset shooting time;

taking a first picture of the object when it is determined that the current moment reaches the preset shooting time;

determining a difference between a first image in the preset area of the first picture and a second image in the preset area of a second picture taken at a previous preset shooting time; and saving the first picture when the determined difference between the first and second images is equal to or greater than a second preset threshold value.

\* \* \* \* \*